(12) United States Patent
Min et al.

(10) Patent No.: US 6,674,589 B2
(45) Date of Patent: Jan. 6, 2004

(54) METHOD FOR HARMONIC FREQUENCY IDENTIFICATION IN A DISC DRIVE

(75) Inventors: ShuangQuan Min, Singapore (SG); Ricky Wei Watt Yeo, Singapore (SG); KianKeong Ooi, Singapore (SG); MingZhong Ding, Singapore (SG); YangQuan Chen, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 265 days.

(21) Appl. No.: 09/792,654

(22) Filed: Feb. 23, 2001

(65) Prior Publication Data

US 2001/0036027 A1 Nov. 1, 2001

Related U.S. Application Data

(60) Provisional application No. 60/184,931, filed on Feb. 25, 2000.

(51) Int. Cl.[7] ............................................... G11B 27/36
(52) U.S. Cl. .................................. 360/31; 360/60
(58) Field of Search ............................ 360/31, 53, 75, 360/60, 77.02, 78.04; 324/210, 212, 226

(56) References Cited

U.S. PATENT DOCUMENTS

| 5,262,907 A | | 11/1993 | Duffy et al. | |
|---|---|---|---|---|
| 5,410,439 A | * | 4/1995 | Egbert et al. | 360/75 |
| 5,475,545 A | | 12/1995 | Hampshire et al. | |
| 5,636,193 A | * | 6/1997 | Ohmi | 360/73.03 |
| 5,657,179 A | * | 8/1997 | McKenzie | 360/78.06 |
| 6,157,116 A | * | 12/2000 | Sampietro et al. | 310/334 |

* cited by examiner

Primary Examiner—Alan T Faber
(74) Attorney, Agent, or Firm—Mitchell K. McCarthy

(57) ABSTRACT

A disc drive device includes a base and a disc rotatably attached to the base. The disc drive also includes an actuator assembly rotatably attached to said base and a device for moving the actuator assembly. The actuator assembly includes an actuator arm and a transducer head in a transducing relationship with respect to the disc. The transducer is attached to the actuator arm. A method of screening disc drives for harmonic resonant frequencies includes sampling the position error signal at a track location in the disc drive, and determining the velocity of the position error signal from the sample of the position error signal. The velocity of the position error signal sample is divided by the position error signal to produce a quotient. The quotient is compared to a selected quotient threshold value to determine the type of a harmonic in the disc drive.

20 Claims, 11 Drawing Sheets

METHOD FOR HARMONIC FREQUENCY IDENTIFICATION IN A DISC DRIVE

RELATED APPLICATION

This application claims the benefit of U.S. Provisional Application Ser. No. 60/184,931, filed Feb. 25, 2000 under 35 U.S.C. 119(e).

FIELD OF THE INVENTION

The present invention relates to the field of mass storage devices. More particularly, this invention relates to a method of screening disc drives for various harmonic frequencies.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer head is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of disc drive. Servo feedback information is used to accurately locate the transducer head. The actuator assembly is moved to the required position and held very accurately during a read or write operation using the servo information.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Controlling the movement of the actuator and attached transducing heads is achieved with a closed loop servo system. U.S. Pat. No. 5,262,907 issued to Duffy et al., and assigned to the assignee of the present invention details an example of such a closed loop servo system. In such a system, position or servo information is prerecorded on at least one surface of one of the discs. The servo system can be either a "dedicated" servo system, in which one entire disc surface in a disc stack is prerecorded with the servo information and a dedicated servo head is used to constantly read the servo information, or an "embedded" servo system, in which servo information is interleaved with user data and intermittently read by the same heads used to read and write the user data.

With either a dedicated or embedded servo system, it is common that the servo circuitry produce a servo position error signal (PES) which is indicative of the position of the head relative to the center of a track. The identity of the particular track, as well as other information relating to the circumferential position of the head on the track, is included, along with other information, in the prerecorded servo information. Thus, when the heads are following a desired track, the PES is essentially at a zero value. The PES is fed back to circuitry used to control current through the coil of the actuator. Any tendency of the heads to deviate from true track center causes the PES to change from its zero value. The PES is a bipolar analog signal, meaning that deviation of the head position away from track center in a first direction will produce a PES of a first polarity, while movement of the heads off track center in the opposite direction will produce an PES of the opposite polarity, and the greater the distance of the head from track center, the greater the magnitude of the PES signal. It should be noted that the PES signal relates to each track centerline, and, as such, when the actuator is seeking from one track to another, the PES signal switches from maximum offset value from a first track in a first direction to maximum offset value from a second track in the opposite direction as the moving head passes the midpoint between the first and second tracks.

In the manufacture of disc drives, it is not unusual for tens of thousands of disc drive units to be fabricated daily. With such high numbers of disc drives being made, it is apparent that a certain number of units will fail to meet the design specifications, due to faulty components, improper assembly, contamination, and other elements familiar to those of skill in the art. While every effort is made by disc drive manufacturers to minimize these defective units and assembly errors, a small percentage of defective units will occur. When the defect is introduced into the unit at an early stage in the manufacturing process, the fault may not be detected until a much later stage of the process. Such a delay in the detection of defective assemblies can result in a significant amount of labor costs when taken over the large numbers of units being manufactured.

It has been found that several mechanical defects that can commonly be introduced into the assembly of a disc drive can be closely correlated to the introduction of susceptibility of the unit to resonances at fixed "marker" frequencies. This correlation has come about empirically with the experience of building hundreds of thousands of identical products. With this knowledge, it follows that if the disc drive units can be tested for resonance at the marker frequencies, early detection of the manufacturing defects is possible.

It has been found that resonant frequencies in a mechanical structure can sometimes be identified through the use of a frequency analyzer which, once properly connected to the structure to be tested, injects energy at a selected frequency and then evaluates the structure for gain in the energy which would be indicative of resonance. While the use of a frequency analyzer as an engineering diagnostic tool is well known in the industry, it does have several drawbacks which make such use impractical for large-scale implementation in disc drive manufacturing test operations. Firstly, a frequency analyzer is a complex and expensive piece of diagnostic test equipment, costing several thousand dollars per unit. In a manufacturing environment producing tens of thousands of units per day, a large number of frequency analyzers would be needed in order to provide adequate test capability for the quantity of drives being manufactured, resulting in economically prohibitive capital costs for the manufacturer. Secondly, connecting an analyzer to each structure to be tested and performing the test would require both an operator and a significant amount of time, two elements antithetical to such a high volume production environment. Thirdly, the implementation of automated test result reporting and evaluation with such discrete test equipment would be difficult and resource intensive.

During manufacturing, resonance screening may include analyzing the PES using digital fourier transform (DFT) to analyze the frequency components of the PES. This requires computer time and may slow down the testing portion of the manufacturing process. In addition, such a test may not identify all the potential resonances since using the DFT on a data signal removes phase information. Analysis using DFT on the PES also does not account for shifts in the resonant frequency that may occur as a result of an increase in temperature within the disc drive as it moves to an operating temperature or that may occur as a result of differences in the mechanical components that make up the actuator assembly.

It has also been found that testing for sympathetic resonances in a structure can be accomplished by mounting the unit to be tested to a vibration table, and then injecting either sinusoidal or random vibration energy into the unit during operation and then monitoring for resonant frequencies using suitable test equipment. Again, such a method, although useful during development of a disc drive, would be economically impractical for implementation during large scale manufacture due to capital equipment and resource requirements.

It would, therefore, be desirable to provide a method and apparatus for testing for mechanical defects in disc drives by detecting resonances at corresponding marker frequencies, and culling out units failing the test procedure for repair or remanufacture, while allowing passing units to continue onward in the manufacturing process. It would also be preferable if the test methodology involved a minimum of cost, both in human operator time and capital investment.

What is needed is a method and apparatus to quickly screen disc drives for various frequencies, including frequency around a calculated frequency. There is also a need for a screening test that will determine resonant frequencies for different situations, such as when a disc drive is at an operating temperature or when the mechanical components cause a shift in the frequency. There is also a need for screening test which is quick and which can be easily incorporated into the current manufacturing and testing process. There is still a further need for a screening test that will indicate the amount of gain margin for the resonance.

SUMMARY OF THE INVENTION

A disc drive 100 includes abase 112 and a disc 134 rotatably attached to the base 112. The disc drive 100 also includes an actuator assembly 120 rotatably attached to said base 112 and a device for moving the actuator assembly. The actuator assembly 120 includes an actuator arm 123 and a transducer head 150 in a transducing relationship with respect to the disc 134. The transducer 150 is attached to the actuator arm 126. A method of screening disc drives for harmonic resonant frequencies includes sampling the position error signal at a track location in the disc drive, and determining the velocity of the position error signal from the sample of the position error signal. The velocity of the position error signal sample is divided by the position error signal to produce a quotient. The quotient is compared to a selected quotient threshold value to determine the type of a harmonic in the disc drive. The method further includes storing the track number; and identifying the track as a track not to receive information when the quotient indicates a defect in the disc drive, and preventing the track from receiving information when the quotient is greater than selected value. The sampling the position error signal step includes reading the position error signal using a servo control loop. The determining the velocity of the position error signal step includes taking the derivative of the position error signal with respect to time. The mechanical defect is tagged as related to high frequency harmonics when the value of quotient is greater than the threshold value. The dominant harmonic frequency associated with the mechanical defect is calculated. The mechanical defect is tagged as related to low frequency harmonics when the value of quotient is less than or equal to the threshold value and the dominant harmonic frequency associated with the mechanical defect is calculated.

The step of calculating the dominant harmonic frequency associated with the mechanical defect may include using the quotient in determining the slope of a line associated with the dominant frequency. From the quotient used to determine the slope of a line associated with the dominant a constant multiplier for the quotient can be calculated that produces a best fit to a set of samples at various frequencies. The calculating step can include calculating a constant to add to the quantity of the constant multiplier and the quotient to produce a function best fit to a set of samples at various frequencies.

In addition, a disc drive device includes a base, a disc rotatably attached to the base and an actuator arm for carrying a transducer head in a transducing relation with respect to the disc. The disc drive has a disc drive controller which is coupled to the actuator arm. The disc drive controller further includes a servo controller also coupled to the actuator arm. The servo controller monitors a position error signal in order to follow a track on the disc drive. The disc drive also includes a microprocessor for determining the dominant frequency in the disc drive. The microprocessor samples the position error signal, determines the rate of change of the position error signal with respect to time, calculates the quotient of the rate of change of the position error signal with respect to time and the position error signal, and compares the quotient to a selected threshold. The microprocessor uses the quotient to determine a simulation of a dominant frequency. The microprocessor monitors the position error signal for resonant frequencies within a selected range of resonant frequencies. In some embodiments, the microprocessor monitors the position error signal for resonant frequencies within a selected range of resonant frequencies which includes a dominant frequency. In other embodiments, the microprocessor stores the particular locations on the disc where resonant frequencies occur. In still other embodiments, the microprocessor monitors the position error signal for resonant frequencies within a selected range of resonant frequencies at a particular location on the disc which includes a dominant frequency, and fails the disc when resonant frequencies are identified.

Advantageously, the inventive method and apparatus quickly determines one or more dominant frequencies which can be used to screen disc drives for mechanical defects. More particularly, the method disclosed assures that the proper frequency is assigned when one of two frequency occurrences may satisfy a condition using other methods. The method can be used to quickly approximate the dominant frequency for the disc drive and specific tracks on the disc drive. The harmonic frequency of failed tracks are logged and displayed for failure analysis and the track or tracks that fail the test are passed over for data storage. The end result is a more reliable disc drive having less read errors.

BRIEF DESCRIPTION OF THE DRAWINGS

The features, benefits and objects of the invention can be best understood from the following detailed description of the invention when read in conjunction with the following drawings.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
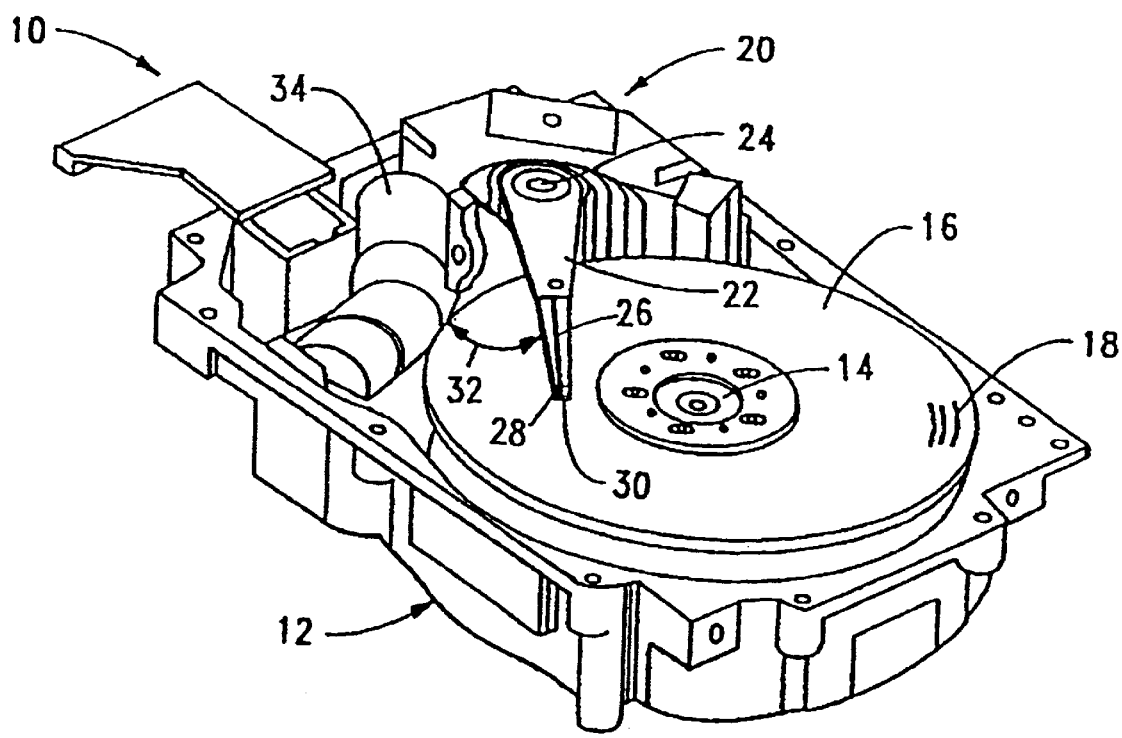
FIG. 1 is a perspective view of a disc drive in which the present invention is particularly useful.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. Turning now to the drawings and more particularly to FIG. 1, shown is a partially exploded isometric view of a disc drive 10 of the type in which the present invention is particularly useful. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14 using a disc clamp (not designated). In this example, the disc clamp is secured using screws (also not designated) equally spaced about the perimeter of the disc clamp. An array of heads (one shown at 30) is mounted via flexure assemblies 26 to an actuator body which is adapted for pivotal motion about a pivot shaft 24 under control of an actuator motor, shown generally at 20.

The actuator motor 20 is driven by electronic circuitry (not shown) to controllably move the heads 30 to any desired one of a plurality of concentric circular tracks 18 on the discs 16 along arcuate path 32. Signals used to control the actuator motor, as well as signals to and from the heads 30, are passed via a printed circuit cable 34.

Because the disc drive 10 illustrated in FIG. 1 includes an actuator motor 20 of the type known as a voice coil motor (VCM), or moving coil motor, the disc drive 10 must also include electronic control logic for moving the heads 30 to any one track 18, and maintaining the heads 30 closely adjacent the track for storing and retrieving data. This control logic is usually referred to as a servo system, and a typical servo system is shown in FIG. 2.

Figure 2:
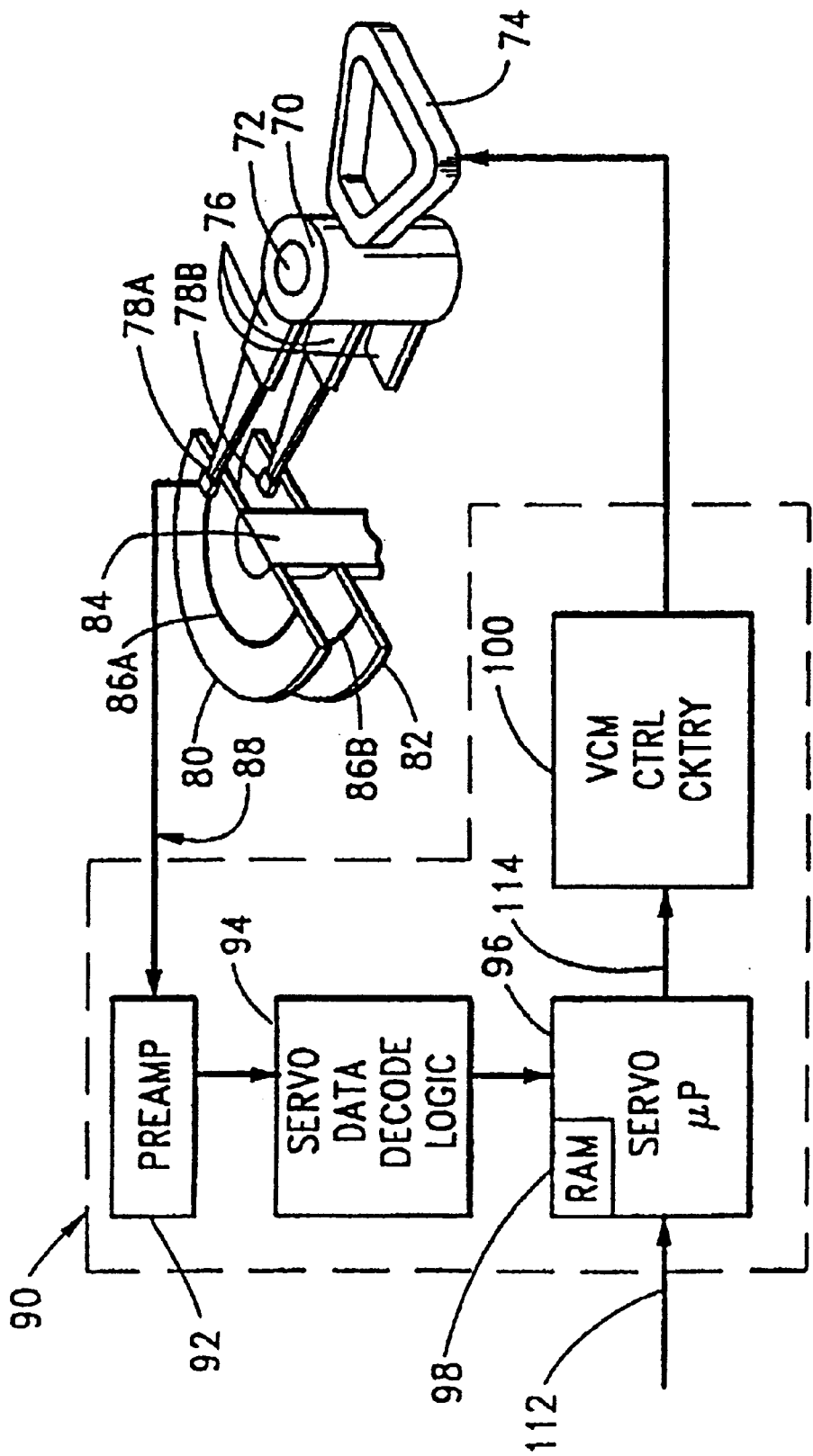
FIG. 2 is a block diagram of the servo system used to control the actuator of the disc drive of FIG. 1.

FIG. 2 is a simplified block diagram of a servo system in which the present invention is particularly useful. Shown in FIG. 2 is an actuator body 70 which pivots about a pivot shaft 72 when drive current is applied to a coil 74 which lies between a pair of permanent magnets (not shown). On the opposite side of the actuator body 70 from the coil 74 is a plurality of head mounting arms 76 which in turn support a number of heads, two of which have been shown as 78A, 78B are arrayed to cooperate with a stack of discs 80, 82 mounted for rotation on a spindle motor 84. While, in actual disc drives, there could be a larger number of discs, and a head associated with each disc surface, for purposes of clarity, only two discs 80, 82 and two heads 78A, 78B are shown.

For this and the following discussion, it will be assumed that the disc drive 10 of the present discussion employs an embedded servo system. The invention is equally applicable to a dedicated servo system in which one head, such as head 78A, is a servo head and the top surface of the top disc 80 is a servo disc that contains prerecorded positional servo information. It will be recognized, however, that the present invention is not dependent upon the use of a particular type of servo system, and that the present invention could be utilized in a disc drive employing an embedded servo system.

Returning to FIG. 2, for clarity all other heads and discs will be referred to as "data heads" or "read/write heads" and "data discs", respectively. As will be recognized, the basic principle of operation of the servo system is that, if the servo head 78A can be made to seek to and follow a given servo track 86A on the servo disc 80, all data heads 78B will simultaneously seek to and follow corresponding data tracks 86B. To facilitate this seeking and track following, servo data 88 read from the servo disc 80 is directed into a servo loop 90 which consists of a preamplifier 92, servo data decode logic 94 which includes an analog-to-digital (A/D) converter (not separately shown), a servo microprocessor 96 with associated RAM 98 and a VCM control circuit 100, which includes a power amp and a digital-to-analog (D/A) converter (both of which are not separately shown). A detailed description of one type of a servo loop 90 can be found in U.S. Pat. No. 5,262,907 entitled HARD DISC DRIVE WITH IMPROVED SERVO SYSTEM, which is also assigned to Seagate Technology Inc. Before continuing with this discussion, it is perhaps better at this time to describe the format of the servo information prerecorded on the servo disc 80.

Figure 3:
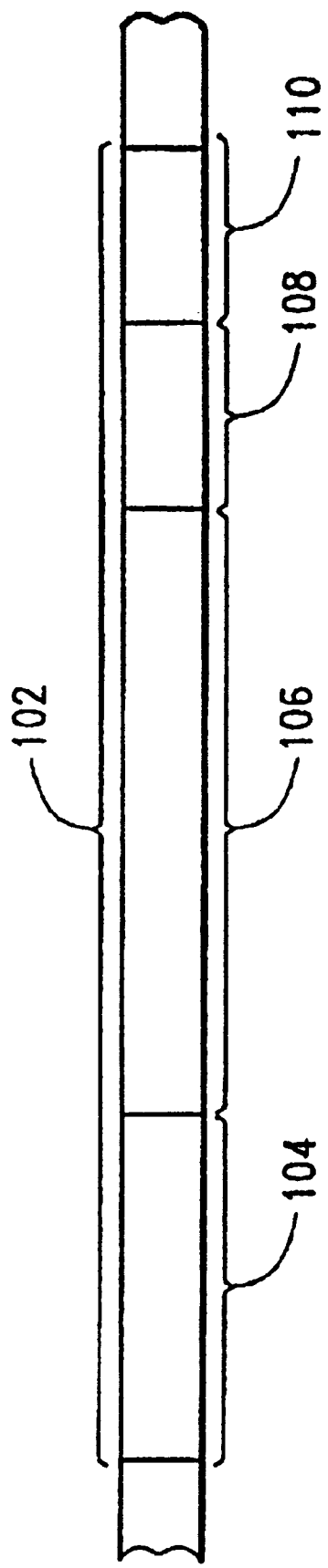
FIG. 3 is a diagrammatic representation of a single frame of servo information for the servo system of FIG. 2.

The servo information on the servo disc 80 may be recorded at the time of manufacture using a highly precise servo writer or may be recorded using product heads. In a dedicated servo system, servo tracks correspond to the locations of data tracks on the other disc surfaces. Each servo track is divided circumferentially into a fixed number of frames, and the format of one such servo frame is shown in FIG. 3. As shown in FIG. 3, each frame 102 is further divided into four separate fields, specifically an address field 104, a position field 106, a sector field 108, and a sync field 110. The function of the address field 104 is to provide a track address; that is, to define the approximate radial position of the head when the address field 104 is read. The position field 106 is used to define the exact radial position of the servo head relative to the servo track. The sector field 108 is encoded with information defining the circumferential position of the disc relative to the head and the sync field 110 is used to aid in the development of timing signals. Furthermore, the final sync field 110 of the final frame 102 contains special coding to define the beginning of each track and allow the generation of an index signal.

In a disc drive using an embedded servo system, each disc 16 is provided with a plurality of radial wedges of servo information which are spaced around the surface of the data disc 16. The heads then read servo information while positioned over the servo wedges and read information related to data when positioned over the data areas. The spacing of the servo wedges and the speed at which the discs are rotated determine the time period between samples and the frequency of the samples.

Referring now to both FIGS. 2 and 3, the servo microprocessor 96 runs a loop program waiting for the servo data decode logic 94 to generate the index signal. At specifically timed intervals during the time the servo frame 102 passes under the servo head 78A, an interrupt is sent to the servo microprocessor 96 and the information in the servo frame 102 is read by the servo microprocessor 96, thus keeping the servo microprocessor 96 constantly aware of the radial and circumferential position of the servo head 78A and, therefore, the data heads 78B as well. The use that the servo microprocessor 96 makes of this information depends on the operational mode of the disc drive at the time of the interrupt. That is, if the disc drive is in a track following mode, the servo loop 90 simply decodes the information in the servo frame 102 to maintain the servo head 78A centered on the current track. If, however, the servo microprocessor 96 has received a command to seek from the current track to another track on command path 112, the servo microprocessor 96 sends a digital value on signal path 114 which causes the VCM control circuitry 100 to apply a controlled DC voltage of the proper polarity to begin moving the actuator in a controlled manner to the desired track. The specifics of track following and seeking are also described in more detail in U.S. Pat. No. 5,262,907, discussed above.

Figure 4:
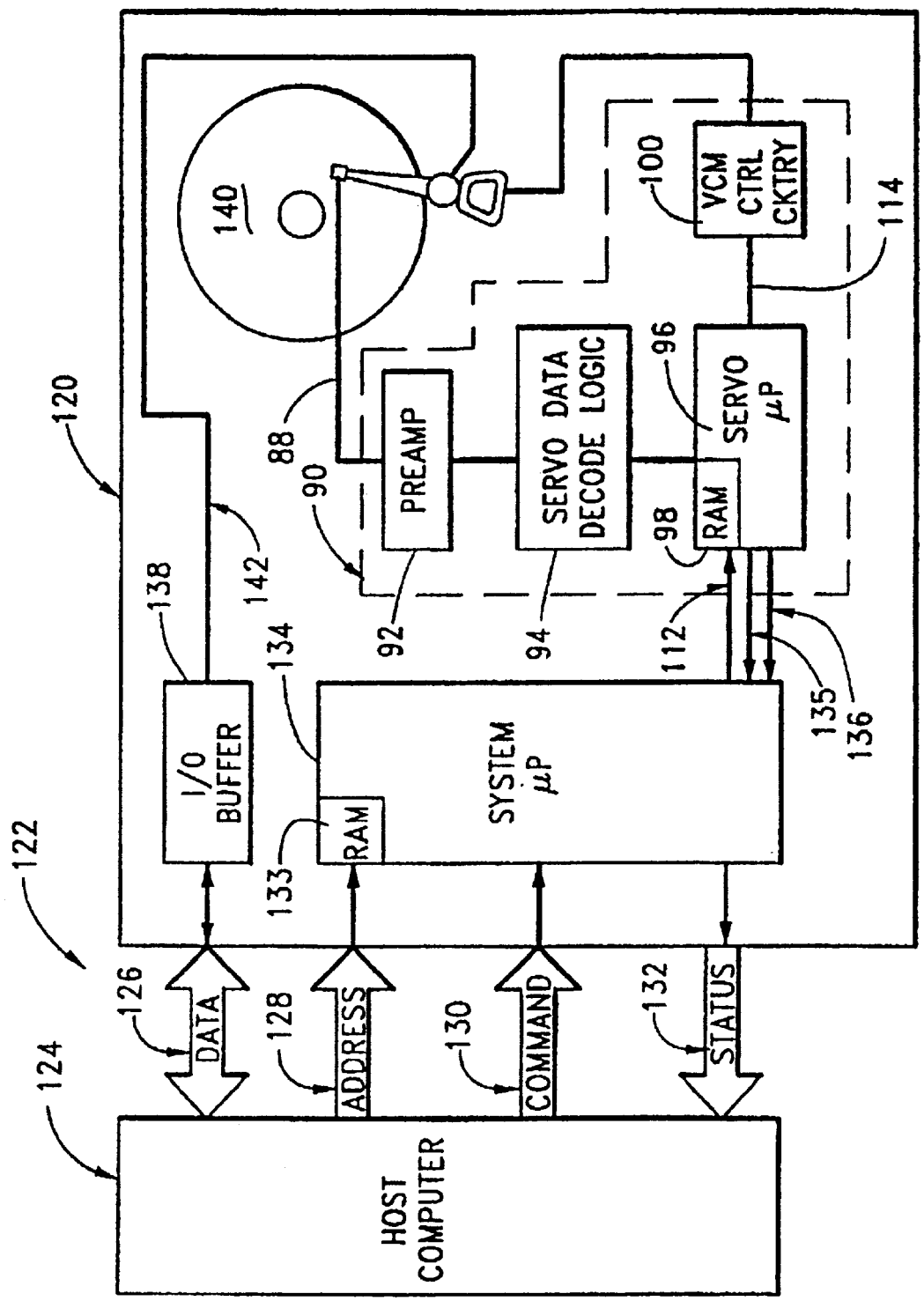
FIG. 4 is a block diagram of the disc drive of FIG. 1 showing the internal electronic circuitry and connection to a host computer system.

An overall system block diagram is shown in FIG. 4, with the servo loop 90 of FIG. 4 included within a disc drive 120. A host interface 122 connects the disc drive 120 to a host computer system 124. Although FIG. 4 shows a single disc drive 120 connected to the host computer 124, the host interface 122 is typically capable of connecting and supporting a plurality of individual disc drives. The host interface 122 includes a bi-directional data bus 126, an address bus 128 for passing logical bus addresses (LBAs) from the host computer 124 to the disc drive 120, a command bus 130, and a status bus 132. The disc drive 120 also contains a system microprocessor 134, the primary function of which is to receive, decode and execute commands from the host computer system 124. These commands are carried to the disc drive 120 by way of the command bus 130. A typical interface of this type may be a SCSI (Small Computer System Interface) Bus.

The SCSI Bus commands define the disc storage space in terms of LBAs. One of the functions of the system microprocessor 134 in the disc drive 120 is to convert these LBAs into a physical address on the disc. The physical address is defined by cylinder, head and sector. A cylinder is the radial position defined by a vertically aligned group of data tracks and a corresponding servo track. Selecting a head defines which of the data tracks in the cylinder will be accessed, and the sector defines the circumferential position on the track where the block of data to be transferred begins. Once the system microprocessor 134 has translated the LBA to a physical address, the seek to that address is initiated by a command passed to the servo microprocessor 96 on the command path 112 in FIG. 6. This command includes a physical address which the servo microprocessor 96 compares with the current position of the actuator derived from the servo data decode logic 94.

If the physical address requested by the system microprocessor 134 differs from the current cylinder, the servo microprocessor 134 initiates a seek to the desired cylinder and reports the completion of the seek to the system microprocessor 134 by way of an inter-processor status bus 136. Once the seek is completed, the system microprocessor 134 then selects the direction for data transfer based on the command received on the host interface 122. That is, if data is to be written onto the disc, the data received over the data bus 126 is passed to a data buffer 138 and then serially written to a disc 140 by way of an internal data bus 142. Completion of the transfer is signified to the host computer system 124 by way of the status bus 132 in the host interface 122. Conversely, if data is to be retrieved from the disc 140, it is serially read from the disc 140 via the internal data bus 142 into the data buffer 138. Notification of the availability of the data in the data buffer is sent to the host computer system 124 via the status bus 132 and the data is then transferred to the host computer system via the data bus 126.

Figure 5:
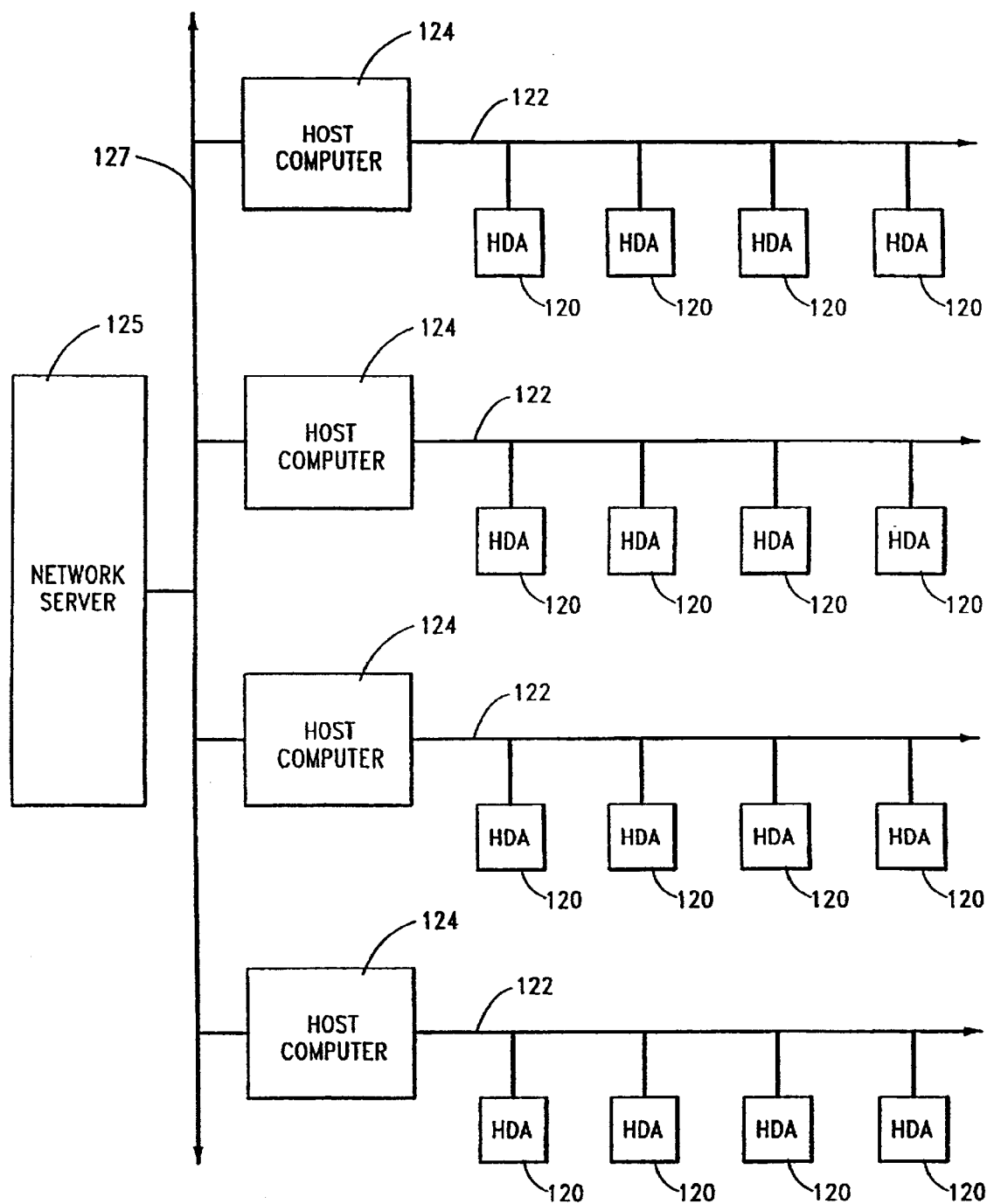
FIG. 5 is a block diagram of a typical high volume test system used during the manufacture of disc drives and capable of performing the method of the present invention.

Turning now to FIG. 5, shown is a block diagram of a typical high volume test system which can be used in the manufacture of disc drives such as those described hereinabove, and which is capable of performing the method of the present invention. The test system includes a plurality of host computer systems 124, typically commonly available personal computers or PCs, connected to each other and a network server 125 via a network bus 127. As is readily seen, each of the host computer systems 124 is connected via its host interface 122 to a plurality of disc drives 120 to be tested. In such a system, the network server 127 typically keeps track of overall system operations, such as throughput statistics, failure rates, etc., and would be especially useful in providing automated test performance information regarding the results of the test of the present invention. Control of specific testing tasks, however, lies within the host computer systems 124. Implementation of specific actions necessary to the performance of the testing tasks is carried out by the interaction of the host computer system 124, system microprocessor and the servo microprocessor, as will be described in detail hereinbelow.

It will also be apparent from FIG. 5 that, in a high volume manufacturing environment, it would not be economically feasible to provide a frequency analyzer costing thousands of dollars each to attach to each of the disc drives being tested. Similarly, it would be extremely inefficient from the point of view of time utilization to provide for a lesser number of frequency analyzers (for instance one per host computer system) and have the operator of the test system connect the frequency analyzer in turn to each individual drive, perform the necessary tests and disconnect the frequency analyzer and move it to the next unit to be tested.

Before continuing with a detailed description of the invention, it should be recalled that the present invention relies on an empirically derived correlation between certain specific mechanical defects in the disc drive and a susceptibility of the disc drive to resonance at a marker frequency. That is, over the history of manufacturing hundreds of thousands—and even millions—of identical disc drive units, a correspondence has been noted between drives with a specific mechanical fault and a tendency for those drives to resonate at a specific frequency. For instance, it has been determined that disc drive units of one design having a particular type of tilt between the actuator and the discs have also found to be particularly susceptible to vibrations at approximately 1.1 kHz. Since this particular mechanical fault was also associated with early failure of the disc drive, it was advantageous to be able to screen for the mechanical fault by testing for resonance at the associated marker frequency. In this manner, the mechanical fault could be identified without the necessity of opening the sealed head/disc assembly and performing a detailed mechanical analysis. Further, it was found that other mechanical defects were reflected in the disc drives' susceptibility to resonance at other specific marker frequencies, and this relationship between mechanical defect and resonant frequency susceptibility forms the foundation on which the present invention is based.

It is well known in the industry that if a large amount of current is suddenly applied to the coil of an actuator voice coil motor, a broad spectrum of vibrations will be excited in the disc drive structures. Historically, such excitation of the disc drive structure was known to induce sympathetic vibrations in the disc drive housing and the generation of undesirable acoustic noise. Thus, it was thought that the abrupt application of current to the coil of the voice coil motor was something to be avoided, and much effort was directed to the prevention of such excitation of the disc drive structure. See, for instance, U.S. patent application Ser. No. 676,78 filed Mar. 28, 1991 now U.S. Pat. No. 5,475,545 by Hampshire et al., entitled METHOD FOR REDUCING NOISE DURING SEEKS IN A HARD DISC DRIVE; and U.S. patent application Ser. No. 923,779 filed Jul. 31, 1992 now U.S. Pat. No. 5,657,179 by McKenzie entitled METHOD FOR REDUCING NOISE DURING TRACK SEEKING IN A DISC DRIVE. Each of these patent applications is assigned to the assignee of the present invention.

The present invention takes advantage of this known phenomenon to provide intentional excitation of the disc drive structure, after which testing for resonance at known marker frequencies can be accomplished. That is, during the test operation, special test seeks are performed which include the abrupt application of acceleration and deceleration current to the coil of the actuator motor. The seek length is selected such that any induced vibration in the disc drive structure will be reflected in the servo loop once the actuator has entered into track following mode at the destination track. Since the marker frequencies differ from mechanical defect to mechanical defect, and since the same defect may be reflected in resonance at differing frequencies in different disc drive designs, it may also be necessary to select various attributes of the test seek, such as seek length, seek direction and starting track for the seek, to ensure that the test seek excites the disc drive structure at the frequency to be tested. Such selection can be empirically derived, by attempting seeks having differing characteristics in disc drives known to have a specific mechanical defect. The seek parameter combination that best serves to excite resonance at the marker frequency is then used by the test program for all drives to be tested.

Figure 6:
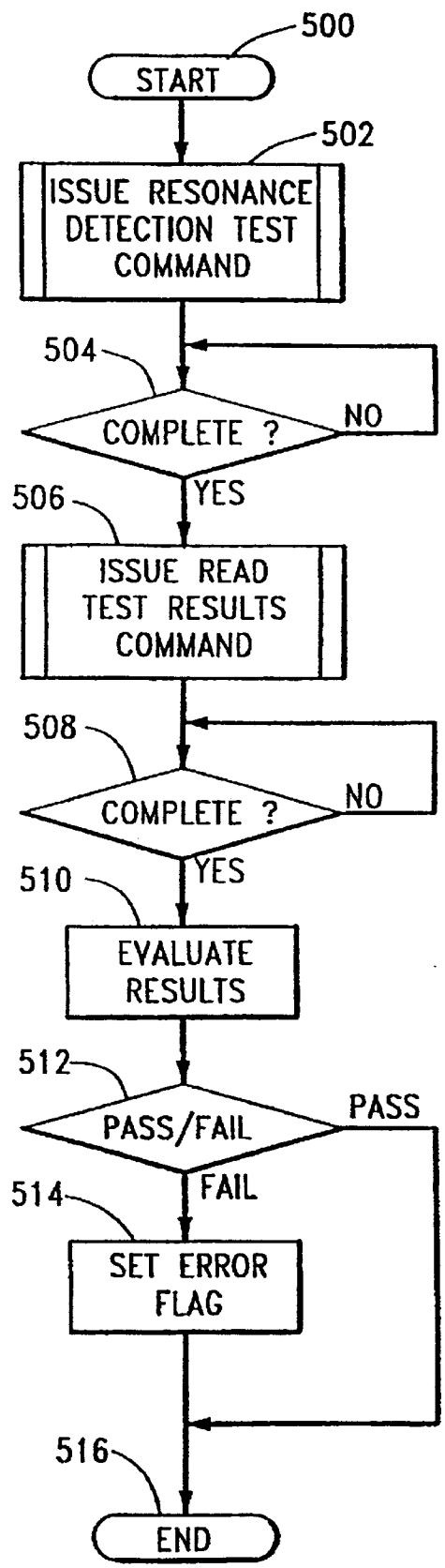
FIG. 6 is a flow diagram of the program executed by one of the host computer systems shown in FIG. 5.

Turning now to FIG. 6, shown is a general flow diagram of a program executed by the host computer system 124 as shown in FIG. 5, which would cause the system microprocessor 134 in the disc drive 120 to perform the steps necessary to implement the method of the invention. It should be recalled that the overall operation of the invention requires linked communication between the host computer system and the system microprocessor in the disc drive, as well as linked communication between the disc drive system microprocessor and the disc drive servo microprocessor. That is, a system level command from the host computer system causes the disc drive system microprocessor to interpret the system level command and pass on to the disc drive servo microprocessor a second set of instructions to which the servo microprocessor responds by executing a specific sequence of physical steps and actions.

The flow diagram of FIG. 6 would be a small portion of the overall test sequence performed on disc drives during the manufacturing test operation. Since the present invention relates to the detection of mechanical defects in the disc drive, it would be logical if this test were performed before certain other long-running tests, such as electronic burn-in, thermal cycling, etc. In this way, early detection of the mechanical defects saves the time and resources needed for the long-term test operations.

When during the course of manufacturing the time comes to perform the method of the present invention, the host program enters its calling routine at the start point 500. The host computer system (124 in FIGS. 4 and 5) then issues a RESONANCE DETECTION TEST command via the host interface (122 in FIGS. 4 and 5) at step 502 and enters a loop at step 504 waiting for the disc drive (120 in FIGS. 4 and 5) to respond with a command complete via the status bus (132 in FIG. 4) which is a portion of the host interface 122. The actions initiated in the disc drive by the RESONANCE DETECTION TEST command will be described in detail below.

Once the host computer system 124 receives the command complete status from the disc drive for the RESONANCE DETECTION TEST command, the host computer system 124 drops out of the loop of step 504 and issues a READ TEST RESULTS command, again on the host interface 122, at step 506, and enters a second loop at step 508 waiting for the disc drive to indicate the completion of the READ TEST RESULTS command by passing the command complete status in the same manner noted above. This READ TEST RESULTS command causes the disc drive to read the results of the completed resonance test from an internal memory location and pass the results to the host computer system via the data bus (126 in FIG. 4) which also forms a part of the host interface 122. Once the command complete status is sent to the host computer system, the host computer system reads the data forming the result of the resonance detection test from the data bus 126 and stores this data in a memory location internal to the host computer system. The actions initiated in the disc drive by the READ TEST RESULTS command will be described in detail below.

Step 510 of the flow diagram of FIG. 6 is a very general step during which the host computer system evaluates the results obtained in step 506. The actual evaluation that occurs can vary greatly based on the specific resonance frequency being tested for in the disc drive, and the associated mechanical defect that the presence of resonance at the frequency represents. In general, though, such an evaluation could comprise the comparison of the numerical test result data to a pre-defined threshold value, and the establishment of a pass.backslash.fail criteria based on this comparison.

The evaluation of step 510 is followed in the host computer system by a pass.backslash.fail decision at step 512. If the evaluation of step 510 produced a "Fail" condition, the flow of FIG. 6 continues to step 514, where an error flag is set. The setting of this error flag could in turn lead to several actions which are in and of themselves not a part of the present invention. For instance, the setting of the error flag could result in the triggering of an audible alarm alerting the operator of the test system that one of the disc drives under test has failed. This in turn would be cause for the operator to take whatever steps are necessary to identify the specific failing disc drive, remove it from the test system, and replace it with another disc drive to be tested. The failed disc drive could then be sent to another location for either teardown and repair, reassembly, remanufacture or scrapping, whatever the manufacturer has determined to be the proper consequence of failure of the test. Further, the test results obtained in step 510 could be collected along with other diagnostic information and transferred along with the failed disc drive unit as an aid to reworking.

If, however, the evaluation of step 510 indicates a "Pass" condition, the flow of the program shown in FIG. 6 ends at step 516, which passes control of the host computer system to the next test in the manufacturing process.

Figure 7:
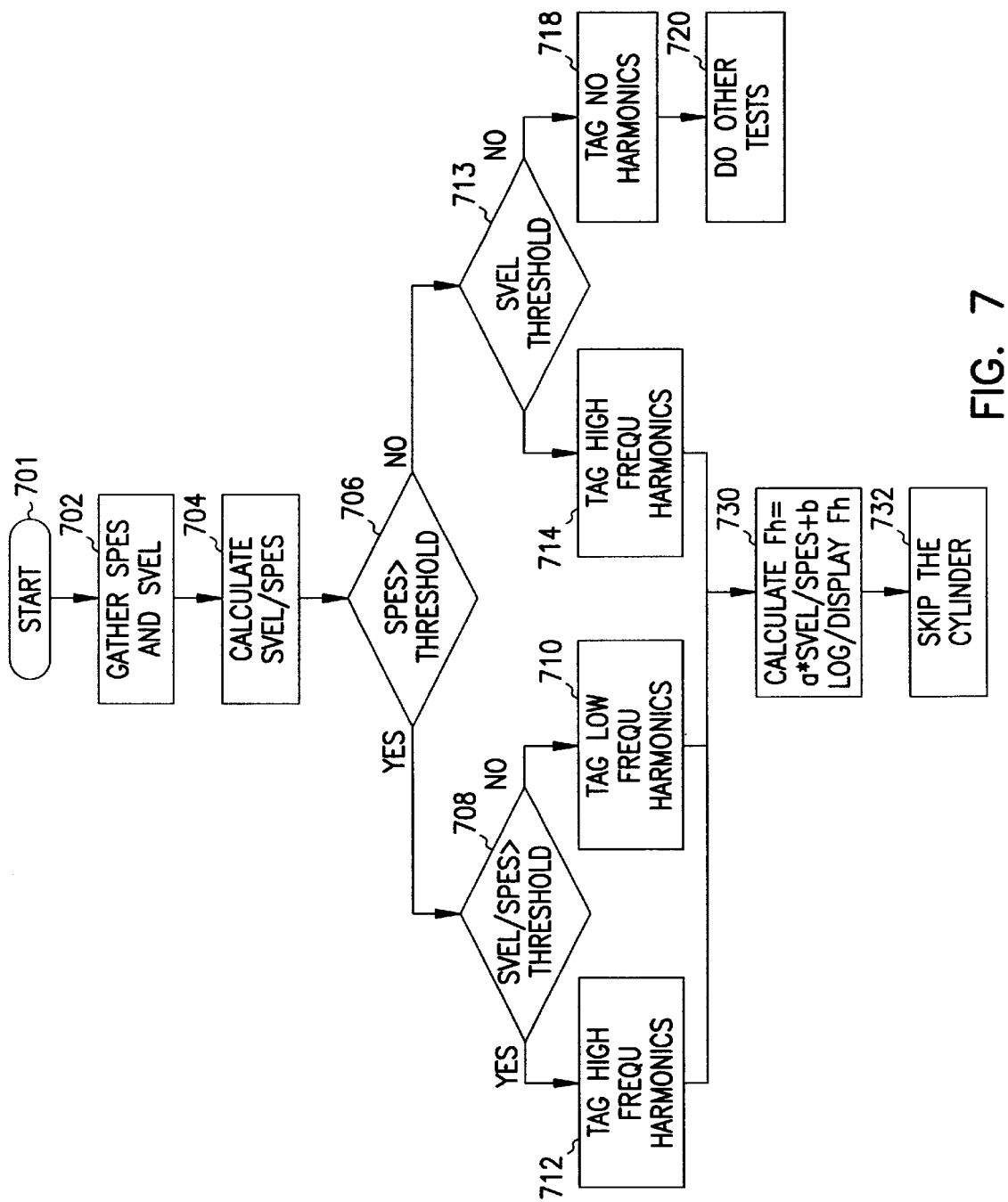
FIG. 7 is a flow diagram of the microprogram executed by the system microprocessor as a result of the execution of one of the commands of the program illustrated in FIG. 6.

FIG. 7 is a flow chart of the program executed by the system microprocessor (134 in FIG. 4) in response to the receipt of the RESONANCE DETECTION TEST command from the host computer system (124 in FIG. 4) as previously discussed in relation to step 502 of the flow of FIG. 6. Once the system microprocessor has decoded the RESONANCE DETECTION TEST command, it enters the flow of FIG. 7 at the START step 701. After starting the process, as depicted by the start box at reference numeral 701, the next step is to gather a summation of the position error signals at each sample time (SPES) and the summation of the velocity signals at each sample time (SVEL). During each rotation of the disc 16, the servo system takes samples of the position and the velocity. Each of these is the summation of the sample of the value for either PES or velocity that is taken and added together during one revolution of a disc along a particular track in a disc drive. The next step is to calculate the value of SVEL divided by SPES, as depicted by reference numeral 704 in FIG. 7. The next step is to compare the SPES value for a particular track to a threshold value which is selected, as depicted by the step having a reference numeral 706. If the SPES value is greater than the threshold, then the value of the quotient SVEL divided by SPES is once again compared to another threshold, as depicted by reference numeral 708. When the quotient of VEL over SPES is less than the threshold, the track is tagged as having low frequency harmonics, as depicted by reference numeral 710. In essence, the particular track is tagged as failing due to having excessive low frequency harmonics. When SVEL over SPES is greater than the threshold, the particular track is tagged as having high frequency harmonics, as depicted by reference numeral 712. In essence, the track fails due to high frequency harmonics when the SPES is greater than the threshold and SVEL over SPES is greater than another threshold. When the SPES is less than the threshold, shown or selected for step 706, but SVEL is greater than the threshold selected, the track fails due to high frequency harmonics and the track is tagged as failing because of high frequency harmonics, as depicted by reference numeral 714. When SPES is less than the threshold and SVEL is also less than the threshold, as depicted by reference numeral 713, there is no failure of the track due to harmonics and, therefore, the track is not tagged for harmonics, as depicted by reference numeral 718. Other tests then are conducted by the testing unit, as depicted by reference numeral 720. In the case when a track fails either due to high frequency harmonics 712, 714 or due to low frequency harmonics 710, the next step is to calculate the harmonic frequency of the failed track, as depicted by reference numeral 730, and to display or log the calculated harmonic frequency. The log or display of the harmonic frequency in the particular track is placed into a lookup table versus the cylinder or track. Tracks having failed due to harmonics are then skipped, as depicted by reference numeral 732. Since the actuator is positioned at the same radial position along all the tracks in a particular cylinder, the entire cylinder may also be skipped, as depicted by reference numeral 732.

The end result of this procedure is a simple test that can be used to determine the harmonic frequency and determine if the actuator positioned on the particular track will fail due to harmonic frequency. The failure mode or the frequency at which a particular track fails is logged or recorded for future failure analysis and for future design purposes. The logging of the failed tracks provides for a much more robust disc drive because data will not be written to the failed track. This assures that the data will not be written to a track where it may be difficult to retrieve data stored thereon.

1. Relation Between PES and Its Harmonic Frequency

Harmonics may occur at multiple frequencies but are dominant at one frequency in actual HDDs. We will try to find a simple method for single frequency identification and discuss the influence of multiple frequencies on the result.

Suppose that a PES waveform is $$p(t) = A \sin(2\pi f_h t) \tag{3a}$$

Where A is the harmonic amplitude and $f_h$ is the harmonic frequency. The velocity of p(t) is $$v(t) = \frac{dp(t)}{dt} = 2A\pi f_h \cos(2\pi f_h t) \tag{3b}$$

For a discrete digital system, the sums or absolute PES and VEL in a revolution are:

$$\sum_{i=1}^{N} |p(iT_s)| = A \sum_{i=1}^{N} |\sin(2\pi f_h i T_s)| \tag{4a}$$

$$\sum_{i=1}^{N} |v(iT_s)| = 2\pi f_h A \sum_{i=1}^{N} |\cos(2\pi f_h i T_s)| \tag{4b}$$

Where $T_s$ is the sampling time, N is the number of samples in one revolution.

Suppose an integer K is the number of cycles in one revolution and M is the number of samples in a cycle, where $$M = \frac{1}{f_h T_s} \gg 1$$

One gets that the area of a unit sine wave in a cycle is equal to that of a unit cosine, i.e., $$\frac{\sum_{j=1}^{M} |\cos(2\pi f_h j T_s)|}{\sum_{j=1}^{M} |\sin(2\pi f_h j T_s)|} = \frac{\sum_{j=1}^{M} \left|\cos\left(2\pi f_h \left(j + \frac{k}{f_h T_s}\right) T_s\right)\right|}{\sum_{j=1}^{M} \left|\sin\left(2\pi f_h \left(j + \frac{k}{f_h T_s}\right) T_s\right)\right|} \cong 1 \tag{5}$$

Where k is an arbitrary integer, and $0 \leq k \leq K$. Therefore, for a revolution, one gets $$\frac{\sum_{i=1}^{N} |v(iT_s)|}{\sum_{i=1}^{N} |p(iT_s)|} = \frac{2\pi f_h A \sum_{i=1}^{N} |\cos(2\pi f_h i T_s)|}{A \sum_{j=1}^{N} |\sin(2\pi f_k i T_s)|} \tag{6}$$

$$\cong 2\pi f_h \frac{\sum_{j=0}^{K-1} \sum_{i=1}^{M} \left|\cos\left(2\pi f_h \left(i + \frac{j}{f_h T_s}\right) T_s\right)\right| + \sum_{i=1}^{m} \left|2\pi f_h \cos\left(i + \frac{K}{f_h T_s}\right)\right|}{\sum_{j=0}^{k-1} \sum_{i=1}^{M} \left|\sin\left(2\pi f_h \left(i + \frac{j}{f_h T_s}\right) T_s\right)\right| + \sum_{i=1}^{m} \left|2\pi f_h \sin\left(i + \frac{K}{f_h T_s}\right)\right|}$$

$$\cong 2\pi f_h$$

Where N=KM+m; $0 \leq m < M$

Finally, one gets harmonic frequency:

$$f_h \cong \frac{1}{2\pi} \sum_{i=1}^{N} \frac{|v(iT_s)|}{\sum_{i=1}^{N} |p(iT_s)|} \tag{7}$$

$$= \frac{1}{2\pi T_s} \sum_{i=1}^{N} \frac{|p(iT_s) - p((i-1)T_s)|}{\sum_{i=1}^{N} |p(iT_s)|}$$

$$= \frac{1}{2\pi T_s} \frac{SVEL}{SPES}$$

Figure 8:
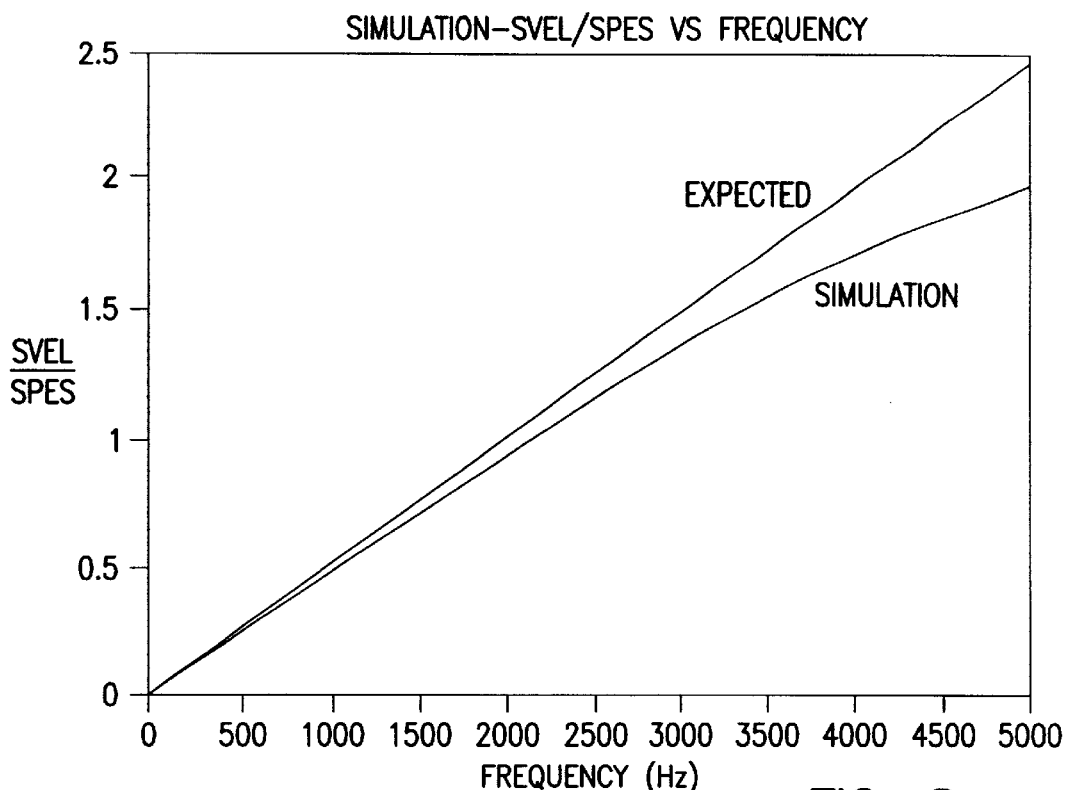
FIG. 8 is a graph of the quantity of SVEL/SPES verses the frequency in Hertz (HZ) which is a simulation of the frequency measurement in a disc drive.

In an example disc drive, N=144, $T_s$=0.077 ms. When the harmonic frequency $f_h$=900 hz, M=14.43 (14 or 15 samples each cycle), K=10 and m=0. The values of M, K and m affect the accuracy of computation results. For low frequency, M is large but K is small. Therefore, the value of m will affect the accuracy. Fortunately, m=0 in actual HDDs since $f_h$ is of high order spindle harmonics. For high frequency, K is large and M is small. A small M reduces the harmonic measurement accuracy as shown in FIG. 8. The accuracy at high frequency is worse than that at low frequency for single frequency harmonics.

Now we discuss the influence of multiple frequency on the computation results. For simplicity, we focus on two-frequency harmonic as follows:

$$p(t) = A_1 \sin(2\pi f_1 t) + A_2 \sin(2\pi f_2 t) \tag{8}$$

Where $A_1$ and $A_2$ are the amplitudes of $f_1$ and $f_2$ harmonic respectively. From (8), one can get v(t) in the same way. For digital sampling system, suppose $$\frac{\sum_{i=1}^{N} |v(iT_s)|}{\sum_{i=1}^{N} |p(iT_s)|} = \frac{2\pi \sum_{i=1}^{N} |f_1 A_1 \cos(2\pi f_1 i T_s) + f_2 A_2 \cos(2\pi f_2 i T_s)|}{\sum_{i=1}^{N} |A_1 \sin(2\pi f_1 i T_s) + A_1 \sin(2\pi f_2 i T_s)|} \tag{9}$$

$$= 2\pi f_h$$

where $f_h$ is the nominal frequency of the combination of two frequencies.

We simulate the effect of both frequencies on the nominal frequency using the following waveform:

$$p(t) = A \sin(2\pi f_1 t) + (1-A) \sin(2\pi f_2 t) \tag{10}$$

where $0 \leq A \leq 1$.

Figure 9:
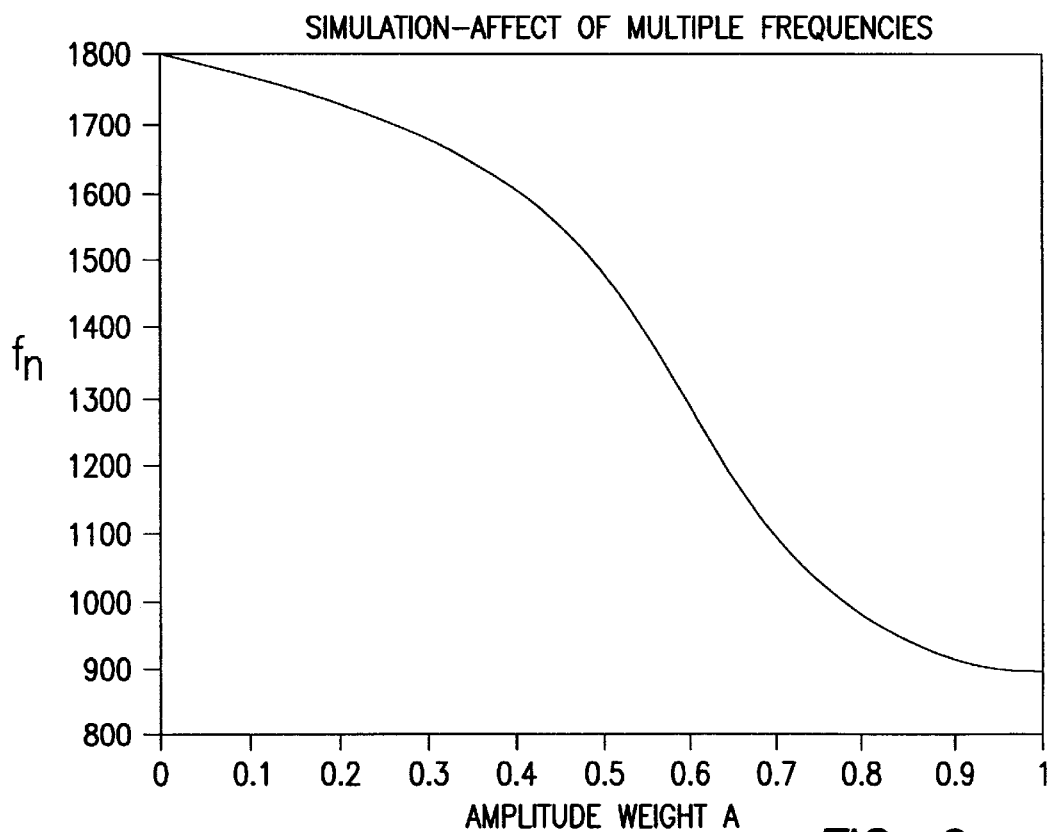
FIG. 9 is a graph showing a simulation of the affect of having multiple resonant frequencies in a disc drive.
Figure 10:
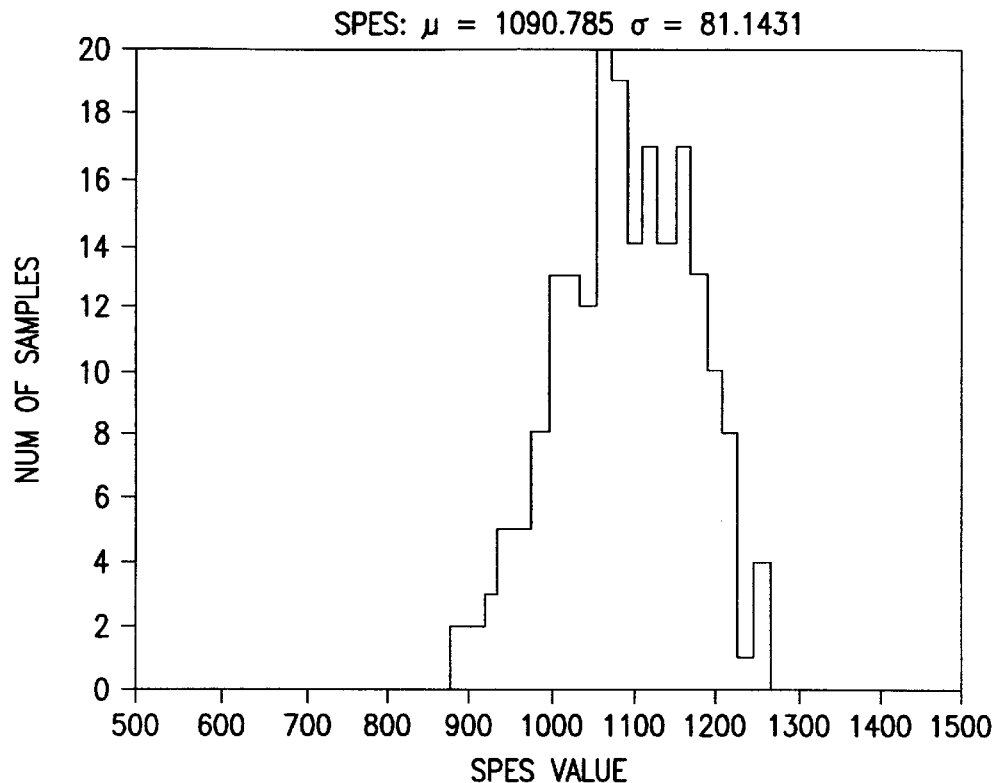
FIG. 10 is an SPES distribution of samples within a disc drive.
Figure 11:
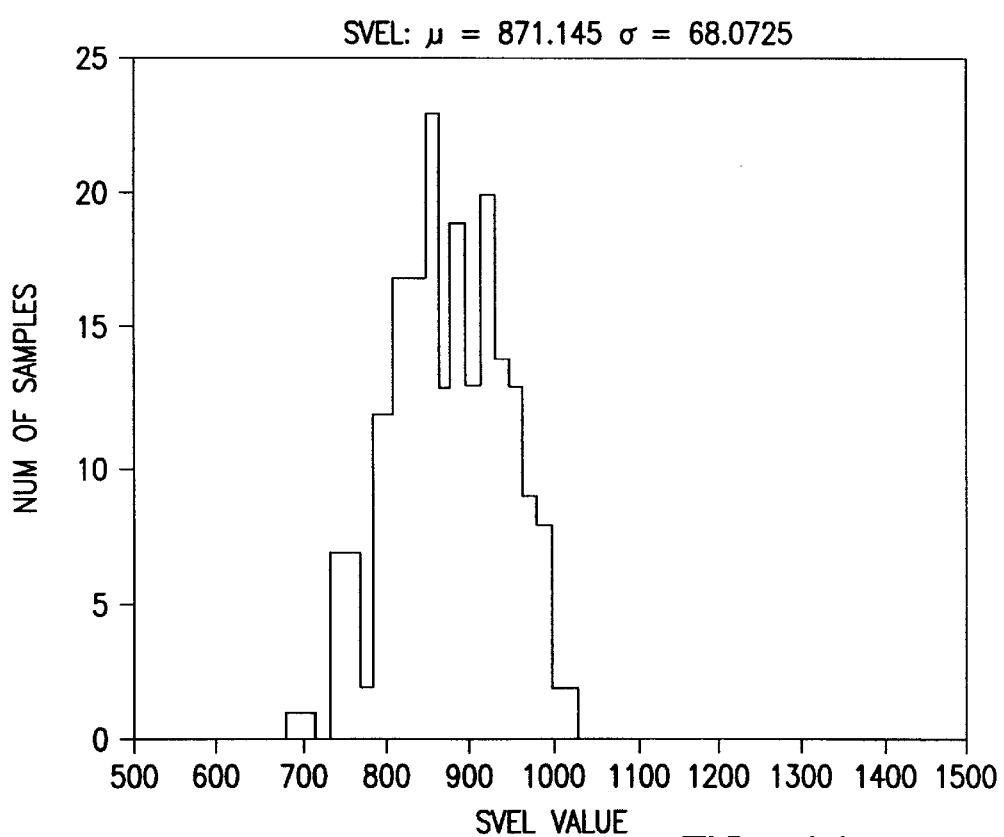
FIG. 11 is an SVEL distribution of samples within a disc drive.
Figure 12:
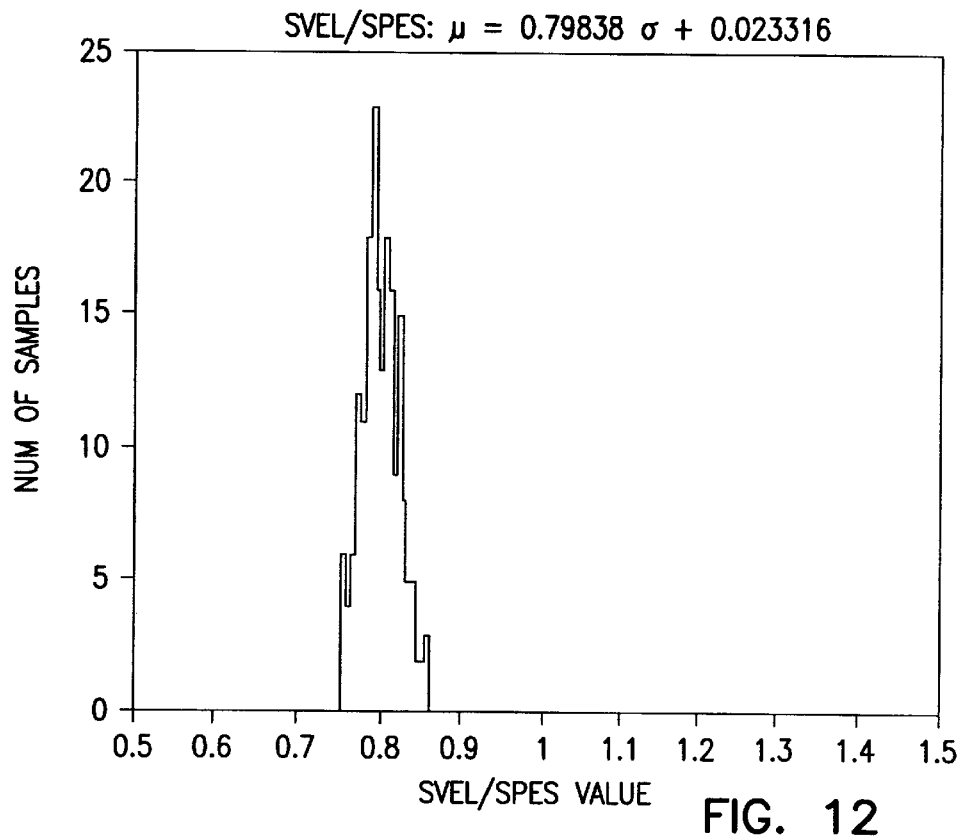
FIG. 12 is an SVEL/SPES distribution of samples within a disc drive.
Figure 13:
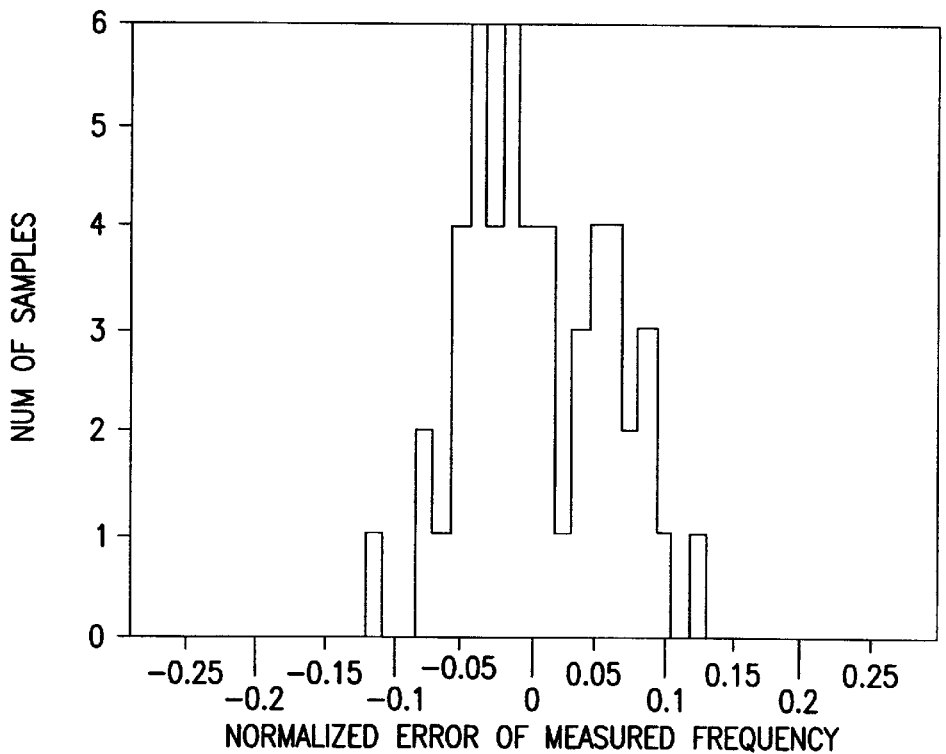
FIG. 13 is a distribution of normalized error of an SVEL/SPES distribution of samples within a disc drive after undergoing an optimization calculation.

FIG. 9 is the relationship between the nominal frequency $f_h$ in formula (9) and the relative magnitudes of two frequencies. Formula (9) and the simulation result in FIG. 2 shows that the nominal frequency is determined by both their frequencies and their magnitudes. The nominal frequency is closer to the frequency with large magnitude. In actual drives, the failed tracks in PES test are usually due to a dominant harmonic frequency with a magnitude much larger than the other subordinate frequencies. Therefore, the frequency obtained by formula (7) is an approximation to the dominant harmonic frequency.

Considering the inaccuracy due to formula (7) and (9), we use the following empirical formula to get the approximate frequency of dominant harmonics:

$$f_h = a\frac{SVEL}{SPES} + b = ax + b \quad x = \frac{SVEL}{SPES} \tag{11}$$

Where a is determined by formula (7) and b is determined by formula (9). The parameter a is used to compensate for sampling accuracy while b is used to compensate for the influence of other non-dominant harmonic frequencies.

2. Optimization of Calibration Parameters

Formula (11) is used to calibrate harmonic frequency. The samples for calibration are gathered from the drives that failed with various harmonic frequencies. The actual dominant harmonic frequency $f_i$ can be obtained by FFT or any other frequency analyzers. The normalized error of sample i can be described as $$e_i(a, b) = \frac{f_i - f_{hi}}{f_i} = 1 - \frac{x_i}{f_i}a - \frac{1}{f_i}b \tag{12}$$

For M samples, the cost function $$\delta(a, b) = \sum_{i=1}^{M} e_i^2(a, b) \tag{13}$$

reaches the minimum when $$\frac{\partial \delta(a, b)}{\partial a} = -2\sum_{i=1}^{M} \frac{x_i}{f_i}\left(1 - \frac{x_i}{f_i}a - \frac{1}{f_i}b\right) = 0 \tag{14a}$$

$$\frac{\partial \delta(a, b)}{\partial b} = -2\sum_{i=1}^{M} \frac{1}{f_i}\left(1 - \frac{x_i}{f_i}a - \frac{1}{f_i}b\right) = 0 \tag{14b}$$

From equation (14), we get optimal parameter a and b for the best fit line:

$$a = \frac{\left(\sum_{i=1}^{M}\frac{x_i}{f_i}\right)\left(\sum_{i=1}^{M}\frac{1}{f_i^2}\right) - \left(\sum_{i=1}^{M}\frac{1}{f_i}\right)\left(\sum_{i=1}^{M}\frac{x_i}{f_i^2}\right)}{\left(\sum_{i=1}^{M}\left(\frac{x_i}{f_i}\right)^2\right)\left(\sum_{i=1}^{M}\frac{1}{f_i^2}\right) - \left(\sum_{i=1}^{M}\frac{x_i}{f_i^2}\right)\left(\sum_{i=1}^{M}\frac{x_i}{f_i^2}\right)} \tag{15a}$$

$$b = \frac{\left(\sum_{i=1}^{M}\frac{1}{f_i}\right)\left(\sum_{i=1}^{M}\frac{x_i}{f_i}\right)^2 - \left(\sum_{i=1}^{M}\frac{x_i}{f_i}\right)\left(\sum_{i=1}^{M}\frac{x_i}{f_i^2}\right)}{\left(\sum_{i=1}^{M}\left(\frac{x_i}{f_i^2}\right)\right)\left(\sum_{i=1}^{M}\frac{1}{f_i^2}\right) - \left(\sum_{i=1}^{M}\frac{x_i}{f_i^2}\right)\left(\sum_{i=1}^{M}\frac{x_i}{f_i}\right)^2} \tag{15b}$$

3. Measurement and Testing

FIG. 4, FIG. 5 and FIG. 6 are distributions of SPES, SVEL and SVEL/SPES respectively getting from 200 revolutions (V8, SN=3DL000GK, Track 3E4Ah, Head 0, On track). Comparing with the distributions of SPES and SVEL, the distribution of SVEL/SPES is more concentrated on the mean value. The reason is that SVEL/SPES eliminates the affect of random fluctuation of PES magnitude.

An algorithm is implemented to distinguish high frequency harmonics from low frequency harmonics by SVEL/SPES, calculate and log/display the harmonic frequency. For a track, when SPES>threshold and SVEL/SPES<threshold, the track fails due to low frequency harmonics. When SPES>threshold and SVEL/SPES>threshold, the track fails due to high frequency harmonics. When SPES<threshold but SVEL>threshold (in this case, SVEL/SPES>threshold), the track fails due to high frequency harmonics. In other cases, the track passes the test. The harmonic frequency of the failed track is calculated using formula (11) and is displayed or logged for further failure analysis. The track that fails the test will be skipped. The flow chart of the algorithm is shown in FIG. 7.

The result is a straightforward approximation method for identification of dominant harmonic frequency. The high frequency harmonics are distinguished from low frequency harmonics by the ratio of the sum of absolute position error signal velocity and the sum of absolute position error signal (i.e., SVEL/SPES). For a track, when SPES>threshold and SVEL/SPES<threshold, the track fails due to low frequency harmonics. When SPES>threshold and SVEL/SPES>threshold, the track fails due to high frequency harmonics. When SPES<threshold but SVEL>threshold (in the case, SVEL/SPES>threshold), the track fails due to high frequency harmonics. In other cases, the track passes the test. The harmonic frequency of the failed track is calculated and logged/displayed for further failure analysis. The harmonic frequency $f_h$ is calculated using formula $f_h$=a*SVEL/SPES+b, where a and b are selected by optimized calibration. The frequency is displayed or logged for further failure analysis. The track that fails the test is skipped for data storage.

Advantageously, the inventive method and apparatus quickly screens disc drives for various frequencies, including frequency around a calculated frequency. The method and apparatus will also determine resonant frequencies for different situations, such as when a disc drive is at an operating temperature or when the mechanical components cause a shift in the frequency. The screening test indicates the amount of gain margin for the resonance frequencies found. The method and apparatus is quick and can be easily incorporated into the current manufacturing and testing process.

Figure 14:
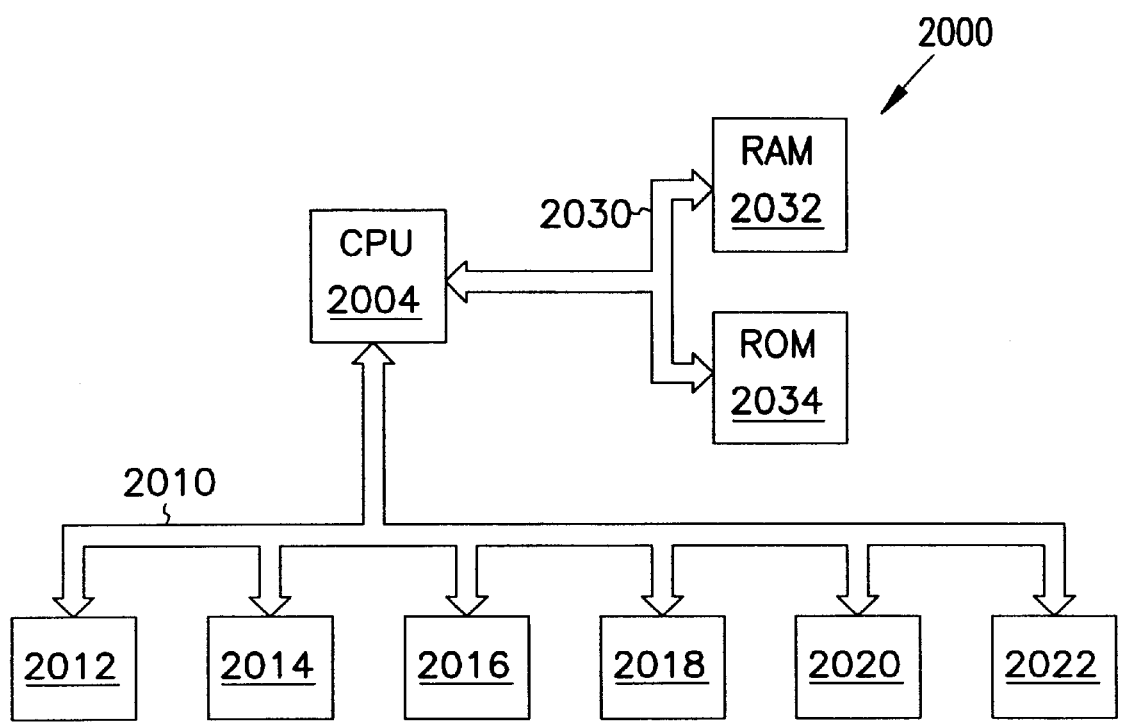
FIG. 14 is a schematic view of a computer system.

FIG. 14 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a disc drive device which includes the ramp described above. The information handling system 2000 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Advantageously, the inventive method and apparatus quickly determines one or more dominant frequencies which can be used to screen disc drives for mechanical defects. More particularly, the method disclosed assures that the proper frequency is assigned when one of two frequency occurrences may satisfy a condition using other methods. The method can be used to quickly approximate the dominant frequency for the disc drive and specific tracks on the disc drive. The harmonic frequency of failed tracks are logged and displayed for failure analysis and the track or tracks that fail the test are passed over for data storage. The end result is a more reliable disc drive having less read errors.

CONCLUSION

A disc drive 10 includes a base 12 and a disc 16 rotatably attached to the base 12. The disc drive 10 also includes an actuator assembly 22 rotatably attached to said base 12 and a device for moving the actuator assembly 22. The actuator assembly 22 includes an actuator arm and a transducer head in a transducing relationship with respect to the disc 16. The transducer is attached to the actuator arm. A method of screening disc drives for harmonic resonant frequencies includes sampling the position error signal at a track location in the disc drive, and determining the velocity of the position error signal from the sample of the position error signal. The velocity of the position error signal sample is divided by the position error signal to produce a quotient. The quotient is compared to a selected quotient threshold value to determine the type of a harmonic in the disc drive. The method further includes storing the track number; and identifying the track as a track not to receive information when the quotient indicates a defect in the disc drive, and preventing the track from receiving information when the quotient is greater than selected value. The sampling the position error signal step includes reading the position error signal using a servo control loop. The determining the velocity of the position error signal step includes taking the derivative of the position error signal with respect to time. The mechanical defect is tagged as related to high frequency harmonics when the value of quotient is greater than the threshold value. The dominant harmonic frequency associated with the mechanical defect is calculated. The mechanical defect is tagged as related to low frequency harmonics when the value of quotient is less than or equal to the threshold value and the dominant harmonic frequency associated with the mechanical defect is calculated.

The step of calculating the dominant harmonic frequency associated with the mechanical defect may include using the quotient in determining the slope of a line associated with the dominant frequency. From the quotient used to determine the slope of a line associated with the dominant a constant multiplier for the quotient can be calculated that produces a best fit to a set of samples at various frequencies. The calculating step can include calculating a constant to add to the quantity of the constant multiplier and the quotient to produce a function best fit to a set of samples at various frequencies.

In addition, a disc drive device includes a base, a disc rotatably attached to the base and an actuator arm for carrying a transducer head in a transducing relation with respect to the disc. The disc drive has a disc drive controller which is coupled to the actuator arm. The disc drive controller further includes a servo controller also coupled to the actuator arm. The servo controller monitors a position error signal in order to follow a track on the disc drive. The disc drive also includes a microprocessor for determining the dominant frequency in the disc drive. The microprocessor samples the position error signal, determines the rate of change of the position error signal with respect to time, calculates the quotient of the rate of change of the position error signal with respect to time and the position error signal, and compares the quotient to a selected threshold. The microprocessor uses the quotient to determine a simulation of a dominant frequency. The microprocessor monitors the position error signal for resonant frequencies within a selected range of resonant frequencies. In some embodiments, the microprocessor monitors the position error signal for resonant frequencies within a selected range of resonant frequencies which includes a dominant frequency. In other embodiments, the microprocessor stores the particular locations on the disc where resonant frequencies occur. In still other embodiments, the microprocessor monitors the position error signal for resonant frequencies within a selected range of resonant frequencies at a particular location on the disc which includes a dominant frequency, and fails the disc when resonant frequencies are identified.

Most generally, an apparatus for testing a disc drive includes a base, an actuator arm rotatably attached to the base, at least one disc rotatably attached to the base, where the actuator arm carries a transducer head in a transducing relation with respect to a disc, and a device for determining a dominant frequency for the disc drive.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of screening disc drives for harmonic resonant frequencies comprising steps of:

(a) sampling a position error signal at a track location in the disc drive; and (b) determining a velocity of the position error signal from a sample of the rate of change of the position error signal;

(c) determining a quotient by dividing the velocity of the position error signal sample by the position error signal; and (d) comparing the quotient to a selected quotient value to determine the type of defect in the disc drive.

2. The method of claim 1, further including the steps of:

(e) storing a track number indicative of the track location; and (f) identifying a track number as a track not to receive information when the quotient indicates a defect in the disc drive.

3. The method of claim 1, further including the steps of:

(e) storing a track number; and (f) preventing the track from receiving information when the quotient is greater than the selected quotient value.

4. The method of claim 1, wherein the sampling the position error signal step (a) includes (a)(i) reading the position error signal using a servo control loop.

5. The method of claim 4, wherein the determining velocity of the position error signal step (b) further includes (b)(i) taking a derivative of the position error signal with respect to time.

6. The method of claim 1, further comprising the step of:
(e) tagging the defect as related to high frequency harmonics when the value of the quotient is greater than the selected quotient value.

7. The method of claim 6, further comprising the step of:
(f) calculating a dominant harmonic frequency associated with the defect.

8. The method of claim 1, further comprising the step of:
(e) tagging the defect as related to low frequency harmonics when the value of the quotient is less than or equal to the selected quotient value.

9. The method of claim 8, further comprising the step of:
(f) calculating a dominant harmonic frequency associated with the defect.

10. The method of claim 1, further comprising the step of:
(e) calculating a dominant harmonic frequency associated with the defect.

11. The method of claim 10, wherein the calculating step (e) further comprises the step of (e)(i) using the quotient in determining a slope of a line associated with the dominant frequency.

12. The method of claim 10, wherein the calculating step (e) further comprises the steps of:
(e)(i) using the quotient as a slope of a line associated with the dominant frequency; and
(e)(ii) calculating a constant multiplier for the quotient that produces a best fit to a set of samples at various frequencies.

13. The method of claim 12, wherein the calculating step (e) further comprises the step of:
(e)(iii) calculating a constant to add to a quantity of the constant multiplier and the quotient to produce a function best fit to a set of samples at various frequencies.

14. A disc drive device, comprising:
a base;
a disc rotatably attached to the base;
an actuator arm for carrying a transducer head in a transducing relation with respect to the disc;
a disc drive controller, coupled to the actuator arm, the disc drive controller further including a servo controller, coupled to the actuator arm, the servo controller monitoring a position error signal in order to follow a track on the disc drive; and
a microprocessor for determining a dominant frequency in the disc drive, the microprocessor
sampling the position error signal,
determining a rate of change of the position error signal with respect to time,
calculating a quotient of the rate of change of the position error signal with respect to time and the position error signal, and
comparing the quotient to a selected quotient value.

15. The disc drive device of claim 14, wherein the microprocessor uses the quotient to determine a simulation of a dominant frequency.

16. The disc drive device of claim 14, wherein the microprocessor monitors the position error signal for resonant frequencies within a selected range of resonant frequencies.

17. The disc drive device of claim 15, wherein the microprocessor monitors the position error signal for resonant frequencies within a selected range of resonant frequencies, the selected range of resonant frequencies including a dominant frequency.

18. The disc drive device of claim 15, wherein the microprocessor monitors the position error signal for resonant frequencies within a selected range of resonant frequencies at a particular location on the disc, the selected range of resonant frequencies including a dominant frequency; and
stores the particular locations on the disc where resonant frequencies occur.

19. The disc drive device of claim 15, wherein the microprocessor monitors the position error signal for resonant frequencies within a selected range of resonant frequencies at a particular location on the disc, the selected range of resonant frequencies including a dominant frequency; and
fails the disc when resonant frequencies are identified.

20. A disc drive, comprising:
a base;
an actuator arm rotatably attached to the base;
at least one disc rotatably attached to the base, where the actuator arm carries a transducer head in a transducing relation with respect to the disc;
means for determining a dominant frequency for the disc drive based on an observed rate of change of a position error signal associated with the transducing relation.

* * * * *